(No Model.)

H. H. FULTON.
CULTIVATOR ATTACHMENT.

No. 359,780. Patented Mar. 22, 1887.

WITNESSES.
Gustav Bohn
Frank S. Hinkley

INVENTOR.
Harmon H. Fulton.
By C. P. Jacobs
Atty.

UNITED STATES PATENT OFFICE.

HARMON H. FULTON, OF INDIANAPOLIS, INDIANA.

CULTIVATOR ATTACHMENT.

SPECIFICATION forming part of Letters Patent No. 359,780, dated March 22, 1887.

Application filed January 3, 1887. Serial No. 223,302. (No model.)

*To all whom it may concern:*

Be it known that I, HARMON H. FULTON, of Indianapolis, county of Marion, and State of Indiana, have invented certain new and useful Improvements in Cultivator Attachments; and I do hereby declare that the following is a full, clear, and exact description thereof, reference being had to the accompanying drawings, in which like letters refer to like parts.

My invention relates to the construction and arrangement of devices for carrying small harrow-teeth, and is designed to be attached firmly to the shank of a cultivator after the shovels are removed, and will be understood from the following description.

Figure 1:
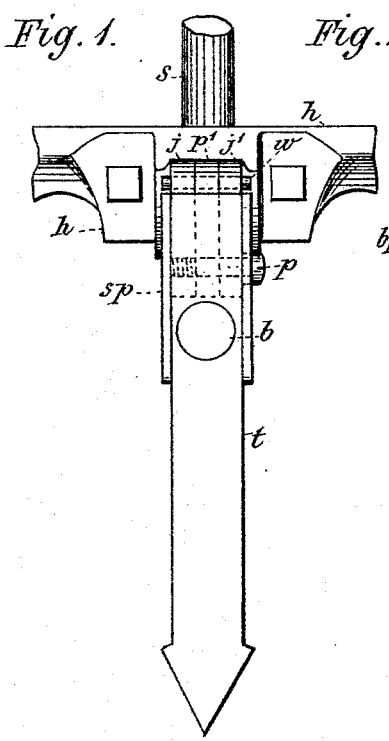
Figure 2:
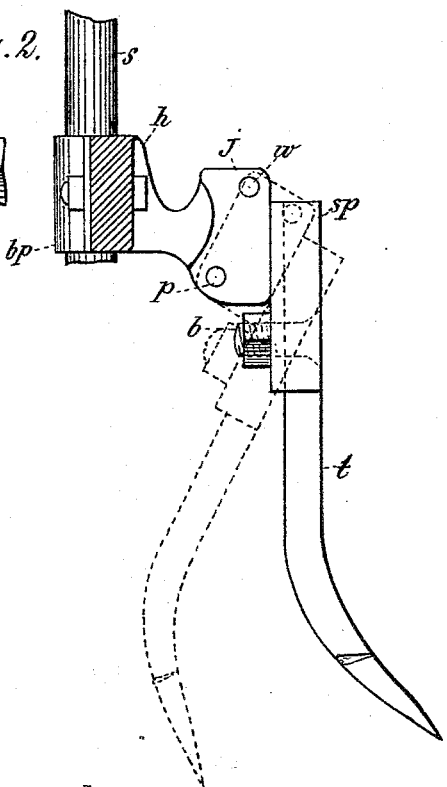
Figure 4:
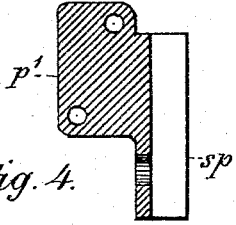
Figure 3:
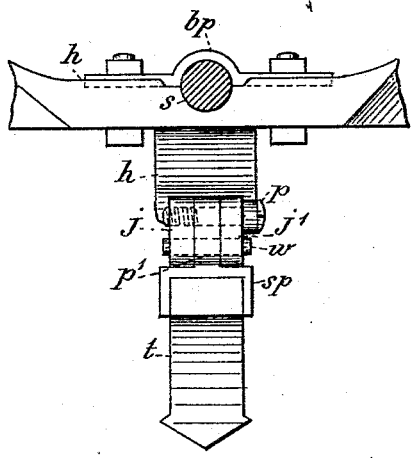

In the drawings, Figure 1 is a front view of my device, the side arms being broken off, being mere duplicates in construction of the arm in front. Fig. 2 is a side view of the device, partly in section, the dotted lines indicating the position of the tooth when forced backward upon its pivot. Fig. 3 is a top view, the shank being shown in cross-section. Fig. 4 is a side view of the socket-plate and its rear projection, showing the holes to receive the pivot and the wooden break-pin.

In detail $h$ is the head, which is attached to the shank $s$ by means of a back plate, $bp$, and bolts passing through the cross-arm of the head and this back plate, as shown in Fig. 3. This head is provided with two or more arms, each of which has a jaw in front, and the lips of these jaws $j$ and $j'$ are of a size to receive the projection $p'$ upon the rear of the socket-plate $sp$. This projection is pierced with two holes, the upper one of these for a wooden break-pin, $w$, the lower one for the pivot-pin $p$. The socket-plate itself is made in the shape shown in Fig. 3, its sides and back forming an open socket or channel to receive the tooth $t$, which, after having been inserted, is secured in this socket by means of a bolt, $b$, as shown in Fig. 2, or by a rivet, if desired.

When the projection of the socket-plate has been inserted in the jaws of the head, the metal pin $p$ is passed through the lower opening, making a pivot upon which the socket-plate will turn, and through the upper opening a frangible pin is passed, commonly called a "break-pin," and made of wood, so that upon the tooth meeting with resistance this pin will break, allowing the tooth $t$ to swing backward upon its pivot $p$, as shown in Fig. 2, without fracture of any of the more expensive parts. Usually three of these arms and jaws are connected with one head, allowing the insertion of as many socket-plates.

I am aware that heads having arms provided with jaws to receive harrow-teeth and to be attached to the shank of a cultivator are not new, and do not broadly claim the same as my invention; but in those with which I am acquainted the teeth have been shouldered to fit into the jaws of the head, which is an objectionable form of construction, on account of expense and the weakening of the metal at that point.

My invention consists in connecting the tooth first to the socket-plate $sp$ by means of a boot or rivet, as shown in Fig. 2, and the side flanges of the open socket form a continuous bearing along the sides of the tooth, preventing any lateral movement thereof, while the rear part of the socket-plate, to which the tooth is connected, is hinged into the jaw, instead of the tooth itself, and the latter, when secured in the manner shown, is easily removed when necessary.

I claim for this construction that it is cheaper to make; that the tooth is more firmly held and prevented from making any lateral movement, and that it is stronger than other devices heretofore used.

What I claim as my invention, and desire to secure by Letters Patent, is the following:

1. An attachment for cultivators comprising, in combination, a head provided with an arm having jaws to receive a plate having an open socket upon its outer face, whose sides provide bearings for the shank of the tooth along their entire length, this socket-plate pivoted in the jaws of the arm at a point near the bottom and further secured therein near the top by a frangible pin and fastened to the socket-plate by a bolt or rivet, with means for attaching the head to the cultivator-shank, all combined substantially as described.

2. In a cultivator attachment, the socket-plate $sp$, having rear projection, $p'$, with openings at adjacent corners to receive the pivot and break pin, the head $h$, having jaws $j$ and $j'$, to receive the projection of the socket-plate, the parts united by pivotal and frangible pins, and the tooth connected to the socket-plate, all combined substantially as described.

In witness whereof I have hereunto set my hand this 30th day of December, 1886.

HARMON H. FULTON.

Witnesses:
C. P. JACOBS,
FRANK S. HINKLEY.